(12) United States Patent
Jung

(10) Patent No.: US 12,420,715 B2
(45) Date of Patent: Sep. 23, 2025

(54) VEHICLE LUGGAGE BOX

(71) Applicants: Hyundai Motor Company, Seoul (KR); Kia Corporation, Seoul (KR)

(72) Inventor: Doo Young Jung, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 473 days.

(21) Appl. No.: 17/968,909

(22) Filed: Oct. 19, 2022

(65) Prior Publication Data

US 2023/0173987 A1 Jun. 8, 2023

(30) Foreign Application Priority Data

Dec. 2, 2021 (KR) .......................... 10-2021-0171033

(51) Int. Cl.
*B60R 7/02* (2006.01)
*B60R 7/08* (2006.01)

(52) U.S. Cl.
CPC . *B60R 7/02* (2013.01); *B60R 7/08* (2013.01)

(58) Field of Classification Search
CPC .............. B60R 7/02; B60R 7/08; B62D 65/16
See application file for complete search history.

(56) References Cited

U.S. PATENT DOCUMENTS

| | | | | |
|---|---|---|---|---|
| 5,439,150 A * | 8/1995 | Trahms | ..................... | B60R 9/00 224/543 |
| 6,176,540 B1 * | 1/2001 | Whittaker | .............. | B60J 7/1621 296/100.09 |
| 6,588,819 B1 * | 7/2003 | Block | ..................... | B60J 7/106 296/10 |
| 7,052,067 B2 * | 5/2006 | Walker | ..................... | B60R 11/02 296/37.6 |
| 8,672,387 B1 * | 3/2014 | Kaku | ........................ | B60R 7/04 296/65.05 |
| 10,286,853 B1 * | 5/2019 | Carbone | ................. | B60P 1/003 |
| 10,569,714 B2 * | 2/2020 | Amoriello | ............. | F04D 29/044 |
| 10,640,155 B2 * | 5/2020 | Sharma | ................... | B60P 3/423 |
| 10,821,597 B2 * | 11/2020 | Berger | .................... | B65D 21/02 |
| 10,857,948 B2 * | 12/2020 | Lim | ........................ | B60R 9/055 |
| 11,242,011 B2 * | 2/2022 | Cho | ......................... | B60R 7/04 |
| 11,279,213 B2 * | 3/2022 | Hickey | ............... | B60R 11/0217 |
| 2007/0164066 A1 * | 7/2007 | Jones | ..................... | B60R 9/055 224/328 |

(Continued)

FOREIGN PATENT DOCUMENTS

| KR | 20210083533 A | 7/2021 |
|---|---|---|
| KR | 20230083001 A | 6/2023 |

*Primary Examiner* — Brian D Nash
(74) *Attorney, Agent, or Firm* — Slater Matsil, LLP

(57) ABSTRACT

An embodiment vehicle luggage box includes an inner housing disposed between multiple pillar members arranged in a longitudinal direction of a vehicle and bent so as to protrude upward from an upper body of the vehicle and to connect sides of the upper body, the inner housing having a box shape to allow an item to be loaded therein and having an opening part openable toward a lateral side of the vehicle, a gate covering the opening part of the inner housing and rotatably coupled to an upper part of the inner housing, and an outer housing coupled to the inner housing along an end of the opening part of the inner housing and in contact with an end of the gate.

20 Claims, 13 Drawing Sheets

(56) References Cited

U.S. PATENT DOCUMENTS

| | | | |
|---|---|---|---|
| 2008/0169322 A1* | 7/2008 | Mcmillan | B60R 9/055 |
| | | | 224/315 |
| 2008/0191506 A1* | 8/2008 | Huotari | A47B 37/00 |
| | | | 224/404 |
| 2011/0084104 A1* | 4/2011 | Long | B60R 9/055 |
| | | | 224/328 |
| 2014/0132022 A1* | 5/2014 | Espig | B60J 7/1657 |
| | | | 296/37.7 |
| 2015/0210221 A1* | 7/2015 | Fritsche | B60R 9/055 |
| | | | 224/328 |
| 2017/0001572 A1* | 1/2017 | Viklund | B60R 9/055 |
| 2019/0071025 A1* | 3/2019 | Anton | B60R 9/10 |
| 2023/0032972 A1* | 2/2023 | Neesham | B60R 9/055 |
| 2023/0174161 A1 | 6/2023 | Kim et al. | |
| 2023/0242041 A1* | 8/2023 | Rousseau | B60R 5/00 |
| | | | 296/37.1 |
| 2024/0131995 A1* | 4/2024 | Jovanovic | B60R 9/055 |

* cited by examiner ical field

The present disclosure relates to a technology regarding a vehicle luggage box.

BACKGROUND

Conventional chassis structures have shortcomings in that investment is necessary in large-scale facilities such as a press factory, a chassis welding factory, and a painting factory because chassis are produced by processing and welding components through press processing that uses molds, and the degree of freedom is low in connection with design.

Particularly, existing chassis require frequent design changes when multiple types are produced in small amounts, and the number of necessary molds increases exponentially, thereby posing a problem of increased production costs.

It has recently become necessary to simplify vehicle production and to minimize the development period in order to respond to rapidly changing market environments and customer needs in a timely manner.

Therefore, there is a need for a chassis structure which can respond to various designs, and which has improved chassis assembly characteristics in a smart factory environment.

In addition, there is a need for a vehicle capable of transporting cargo without a driver in the vehicle in line with recent development of autonomous driving technologies, and there is a need for a vehicle which can be manufactured in an eco-friendly smart factory, wherein when the autonomous driving vehicle requiring no driver is manufactured, some components are modularized to reduce costs and to simplify manufacturing, and the chassis is assembled solely by mechanically assembling the modularized vehicle components, such as by bolting, without going through a press process, a chassis welding process, and a painting process.

The above descriptions regarding background technologies have been made only to help understanding of the background of embodiments of the present disclosure, and are not to be deemed by those skilled in the art to correspond to already known prior art.

SUMMARY

The present disclosure relates to a technology regarding a vehicle luggage box. Particular embodiments relate to a chassis structure of a vehicle driven for a purpose such as cargo transportation, mobile market, or the like. Various embodiments relate to a chassis frame structure for simplifying vehicle manufacturing.

Embodiments of the present disclosure can solve problems in the art, and an embodiment of the present disclosure provides an unmanned transportation vehicle wherein multiple pipes are used to assemble the chassis of the vehicle, and a luggage box is simply assembled to the chassis by bolting coupling.

A vehicle luggage box according to embodiments of the present disclosure includes an inner housing disposed between multiple pillar members arranged in a longitudinal direction of the vehicle and bent so as to protrude upward from an upper body of the vehicle and to connect sides of the upper body, the inner housing having a box shape to allow luggage to be loaded therein and having an opening part formed to be open toward a lateral side of the vehicle, a gate formed to cover the opening part of the inner housing and rotatably coupled to the upper part of the inner housing, and an outer housing which is coupled to the inner housing along the end of the opening part of the inner housing and is in contact with the end of the gate.

A weather strip coupled to the end of the outer housing so as to seal between the outer housing and the gate may be included therein.

The inner housing may include a first recess part recessed outwardly on a side surface part thereof to be in contact with a chassis and coupled thereto by bolting.

The inner housing may further include a recess part cover rotatably coupled to the inner housing so as to cover the first recess part.

The opening part of the inner housing is formed to allow the side surface and the upper surface of the vehicle to be open.

The inner housing may include a flange part configured to protrude inward from the side of the opening part and extend in a direction intersecting the protruding direction thereof, and the outer housing may be coupled to the flange part.

The outer housing may include a drainage channel formed to allow moisture to flow downward.

One side of the upper end of the opening part may be formed higher than the other side thereof, and the drainage channel of the outer housing may extend along the shape of the opening part.

The outer housing may include an upper housing coupled to the upper end of the opening part, a lower housing coupled to the lower end of the opening part, and side housings coupled to the lateral sides of the opening part, and the upper housing, the lower housing, and the side housings may be connected to one another.

The upper housing, the lower housing, and the side housings may have ends formed so as to have steps and to correspond to one another and connected so as to overlap one another.

The gate may include a fixation part provided at the lower end thereof to fix the gate to the inner housing, and the inner housing may include an engaging part formed at a position of the lower end of the opening part, which corresponds to the fixation part, such that the engaging part engages with the fixation part and fixes the fixation part.

The inner housing may have a second recess part formed at the lower end of the opening part to be recessed into the lower side of a chassis, the engaging part may be disposed in the second recess part, a first bracket configured to connect the second recess part and the chassis may be further included therein, and the first bracket, the engaging part, and the second recess part may be coupled at once by bolt coupling.

A second bracket configured to connect a chassis and the rear surface of the inner housing may be further included therein, the gate may include a hinge part connected to the upper part of the inner housing, and the second bracket, the inner housing, and the hinge part may be coupled at once by bolt coupling.

A steel plate inserted between the inner housing and the second bracket may be included therein, and the bolt may be made through the steel plate.

Multiple pipes which constitute the upper body and each of which has an open end, and an end patch coupled to close the open end so as to connect the multiple pipes to each other may be included therein, the end patch may be inwardly spaced apart from the end of the pipe of the upper body and coupled thereto by welding, and a bead generated by welding may be positioned in a distancing space formed by the end patch being inwardly spaced apart from the end of the pipe of the upper body.

A vehicle luggage box according to embodiments of the present disclosure is advantageous in that multiple pipes constitute a chassis, and the luggage box is positioned between multiple pillar members disposed on the upper body of the chassis and bent upwards so as to form a pillar and a roof of the vehicle, is coupled to the pillar members, and is open toward a lateral side of the vehicle such that a passenger can easily load cargo into the luggage box from the pedestrian side or unload cargo therefrom.

There is another advantage in that the luggage box is fastened to the chassis made of multiple pipes by bolting coupling, thereby simplifying the coupling process and reducing the manufacturing cost.

DETAILED DESCRIPTION OF ILLUSTRATIVE EMBODIMENTS

Figure 1:
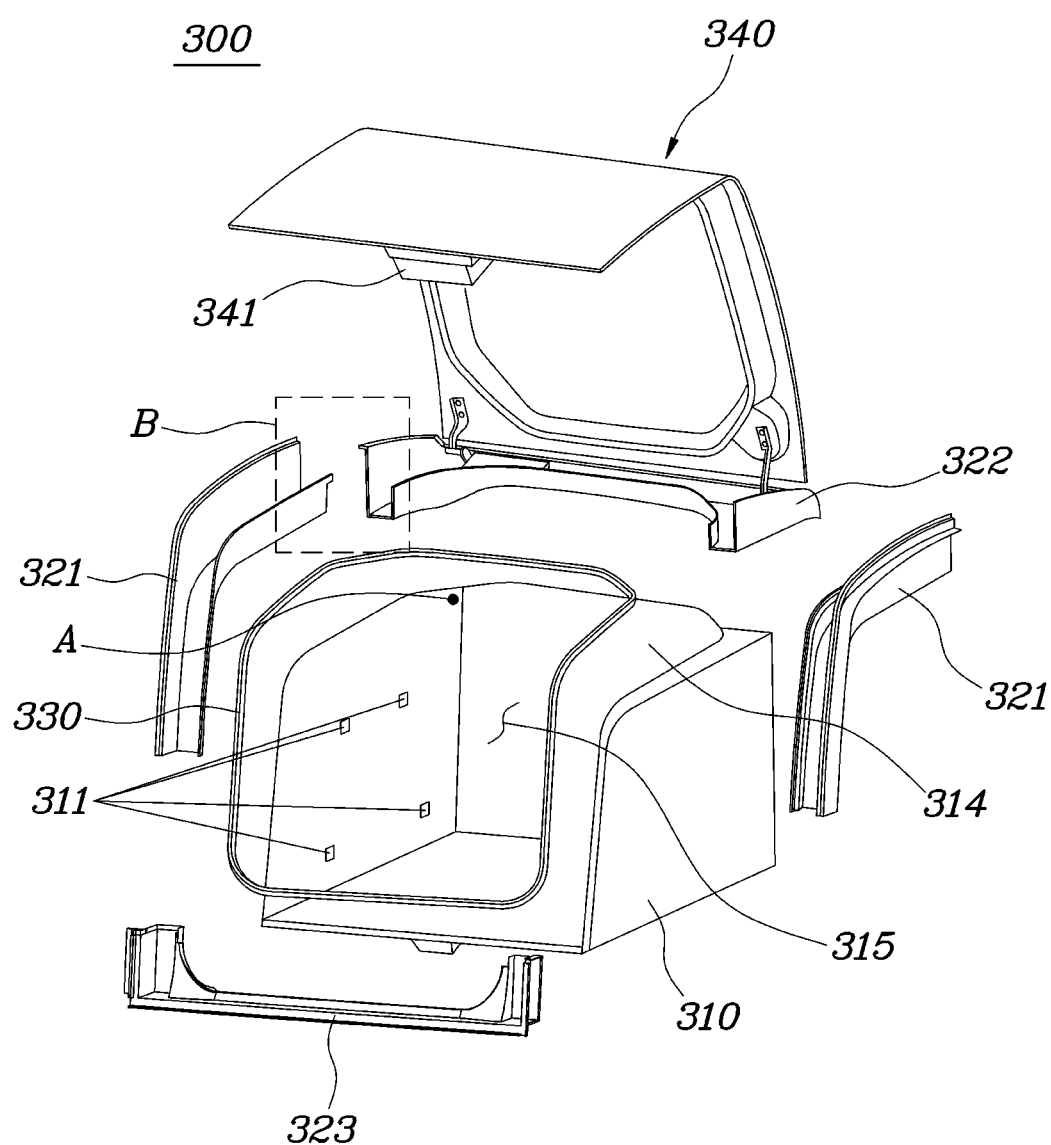
FIG. 1 is a perspective view of a vehicle luggage box according to an embodiment of the present disclosure.

A specific structural or functional description of embodiments of the present disclosure set forth in the specification or application is given merely for the purpose of describing the embodiments according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a first element without departing from the scope of protection of the present disclosure.

In the case where an element is referred to as being "connected" or "coupled" to other elements, it should be understood that not only the element is directly connected or coupled to the other elements, but also another element may exist between them. Contrarily, in the case where a component is referred to as being "directly connected" or "directly coupled" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" is intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. Similar or like reference signs presented in the respective drawings designate similar or like elements.

Conventional vehicles, on which passengers board, require a relatively long manufacturing process and high manufacturing cost in order to provide all of a suspension, an exterior, an interior, a steering device, and a safety device of a vehicle in the vehicle, considering ride comfort, safety specifications, external appearance aesthetics, and driving performance for passengers. In addition, since separate vehicles should be manufactured for each use thereof, there is a problem in that it is difficult to manufacture a customized vehicle available for all uses.

A vehicle, to which a technology according to embodiments of the present disclosure is applied, may be a purpose built vehicle (PBV), that is, a business vehicle having various commercial purposes such as logistics, a food truck, delivery, and service provision. An illustrated embodiment, as a representative example, shows a vehicle for unmanned transportation/logistics/delivery systems for luggage, food, or the like, which enables only luggage to be loaded in the inner space thereof and transported thereto without passengers boarded therein and can be driven through autonomous driving systems.

The vehicle according to embodiments of the present disclosure may have a simple structure to simplify design and manufacturing thereof. The vehicle may enable vehicle components to be modularized and shared so as to reduce a prime cost and facilitate supply and demand of components. The modularized vehicle components may be coupled to each other through an eco-friendly smart factory production method which includes only mechanical coupling such as bolting or riveting without a press process, a weld process of a chassis, and a painting process, and thus a vehicle may be completed.

Embodiments of the present disclosure relate to a technology which enables simplification of a manufacturing process thereof, enables a weld process to be maximally excluded, and enables a chassis to be manufactured through multiple pipes in order to reduce the manufacturing cost of a chassis member. A pipe can be manufactured through extruding, roll forming, or the like, and thus there is an advantage in that the cost thereof is cheap. However, it is necessary to reinforce the coupling strength therebetween when a pipe and a pipe are coupled or a pipe and panels are coupled. Therefore, according to embodiments of the present disclosure, in order that the end of a pipe is strongly coupled to the end of another pipe or panels, a coupling member, which is configured to close the open end of a pipe, may be applied. The coupling member may suppress deformation of the open end of a pipe and may provide a coupling surface for coupling with other components. A specific configuration of the coupling member will be described later. According to a structure in which the pipe and the coupling member of embodiments of the present disclosure are integrated with each other, a chassis may be easily assembled through an eco-friendly smart factory production method which includes only mechanical coupling such as bolting or riveting, and thus the assembly process is eco-friendly since it does not require welding and the like. In addition, some members of a chassis may be easily replaced when an accident or maintenance occurs, and various types of vehicles may be easily assembled and manufactured.

The vehicle, to which embodiments of the present disclosure are applied, may include an area divided into a business area which is positioned thereabove and configured to allow luggage to be loaded therein, and a drive area which is positioned therebelow and associated with driving of the vehicle. The business area may be variously changed according to the needs of a customer, and the drive area may be variously changed according to driving conditions of a vehicle.

Although the vehicle of the illustrated embodiments is basically designed to have a structure which allows a door to be opened only on one side such that a space, in which luggage is loaded, is opened, the business area may be designed in various forms according to the needs of a customer.

An upper body 100 of a vehicle according to embodiments of the present disclosure may constitute a chassis positioned in the business area of a vehicle for the unmanned delivery systems.

The upper body 100 and a lower body 200 may be formed by multiple members which have a pipe shape and are assembled by bolting and the like, and thus may be easily manufactured, repaired, and rebuilt. A lower part of the upper body 100 may constitute a floor, and a driving motor, a wheel, a suspension, a battery, etc. may be mounted on the front side and the rear side of the lower body 200. In addition, an additional battery may be mounted on the center of the lower body 200, or a luggage space may be formed in the center of the lower body. The upper body 100 and the lower body 200 may be fastened to each other upward and downward to form a chassis of a completed vehicle when having been assembled. Therefore, the upper body 100 and the lower body 200 may be assembled in various combinations.

In addition, an inner panel may be coupled to the upper body 100 and the lower body 200 through simple mechanical coupling, such as coupling by bolting or riveting, or fitting coupling between members. In addition, an outer panel, which is coupled to the outer side of the inner panel and functions as the exterior of a vehicle, may be provided, and may be coupled to the inner panel by simple mechanical coupling such as coupling by the bolting or riveting, or by fitting coupling between members.

In addition, the upper body 100 and the lower body 200 formed by the multiple pipes may be provided with pipes which are positioned at a lateral side thereof and extend in the front/rear direction of a vehicle, and the pipes extending in the front/rear direction may be coupled to each other in the vertical direction to constitute the overall length of a vehicle.

A vehicle luggage box 300 according to embodiments of the present disclosure may correspond to the business area positioned in the upper body 100.

Figure 2:
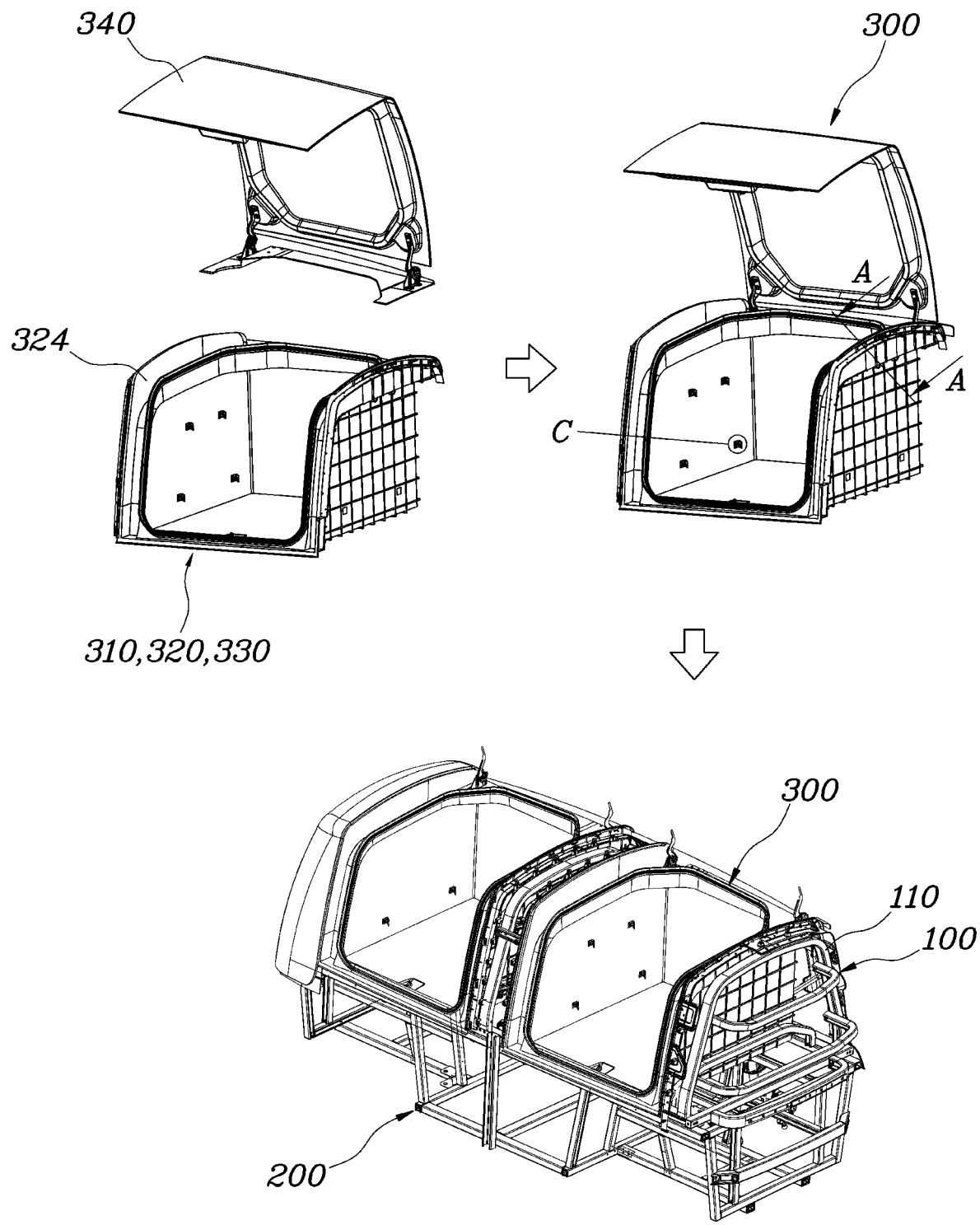
FIG. 2 is a view showing a state where a vehicle luggage box according to an embodiment of the present disclosure is coupled to a vehicle.
Figure 3:
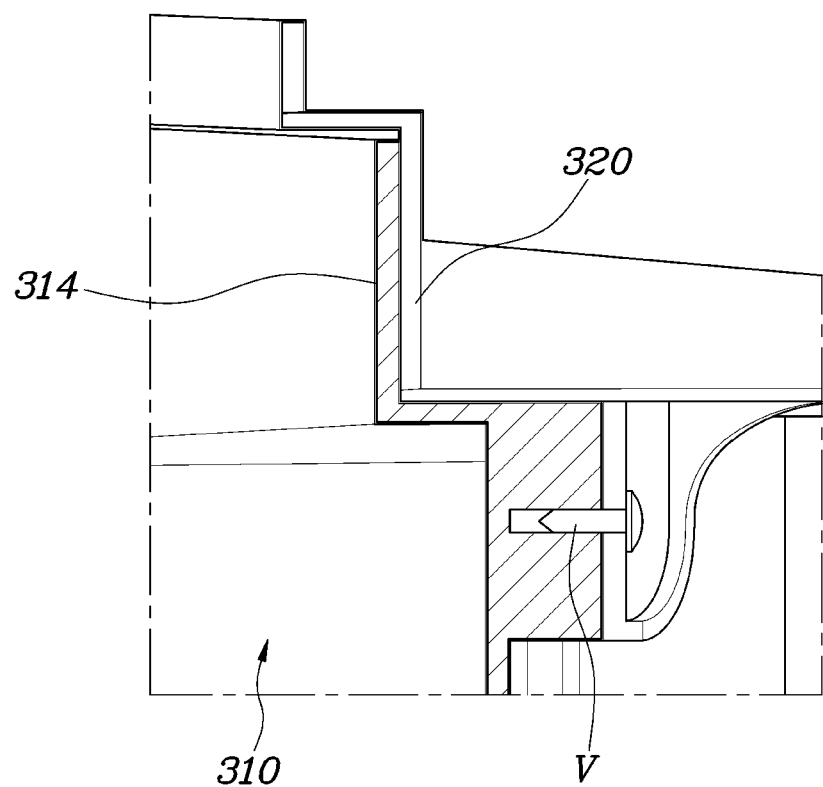
FIG. 3 is a cross-sectional view taken along the line A-A of FIG. 2.
Figure 4:
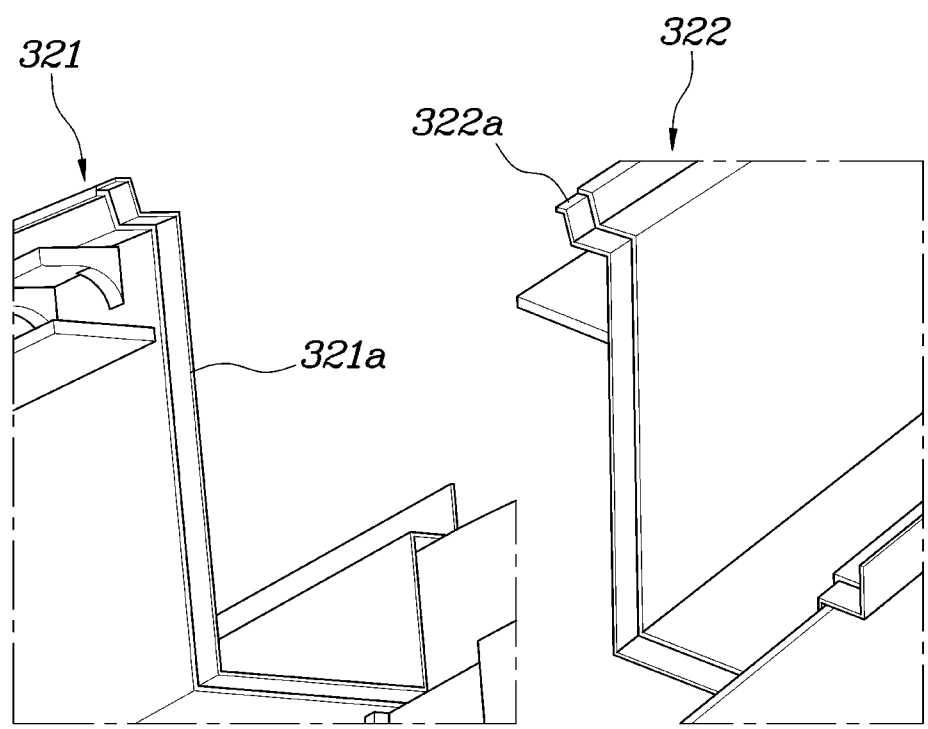
FIG. 4 is a perspective view showing a state where an outer housing of a vehicle luggage box according to an embodiment of the present disclosure is coupled thereto.
Figure 5:
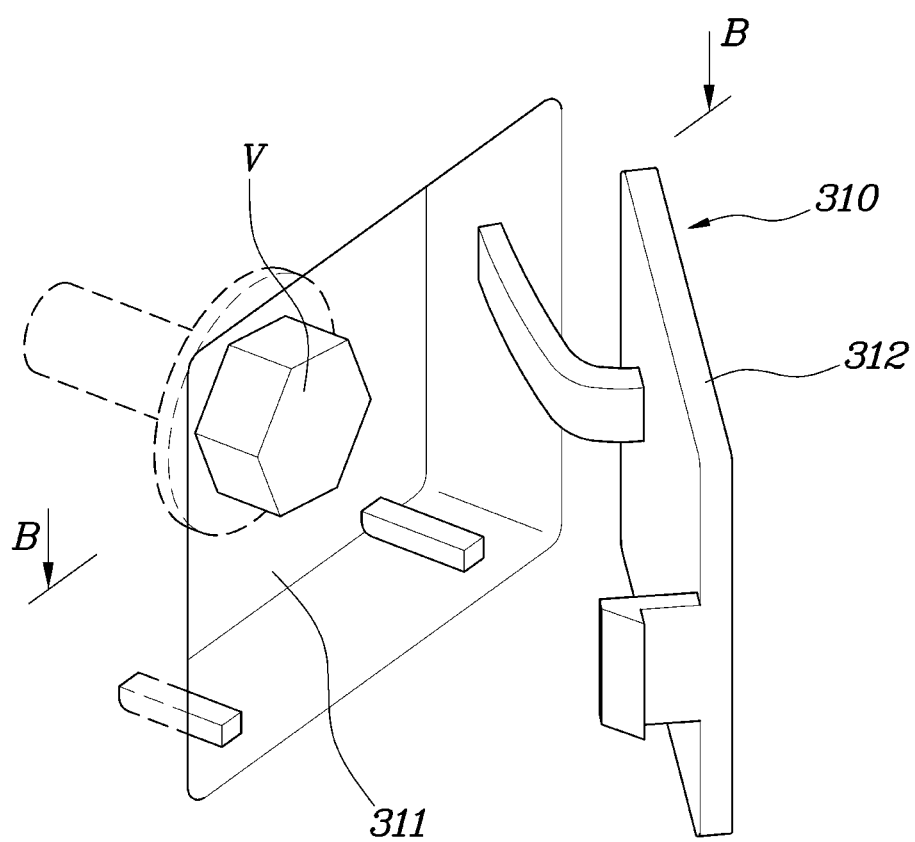
FIG. 5 is a perspective view showing a first recess part of a vehicle luggage box according to an embodiment of the present disclosure.
Figure 6:
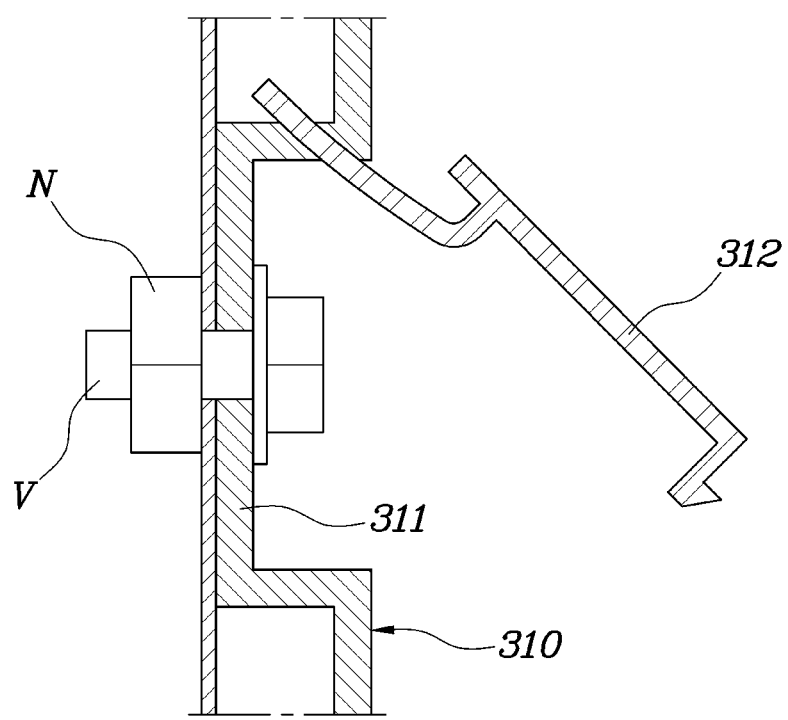
FIG. 6 is a cross-sectional view taken along the line B-B of FIG. 5.

FIG. 1 is a perspective view of a vehicle luggage box 300 according to an embodiment of the present disclosure, FIG. 2 is a view showing a state where a vehicle luggage box 300 according to an embodiment of the present disclosure is coupled to a vehicle, FIG. 3 is a cross-sectional view taken along the line A-A of FIG. 2, FIG. 4 is a perspective view showing a state where an outer housing 320 of a vehicle luggage box 300 according to an embodiment of the present disclosure is coupled thereto, FIG. 5 is a perspective view showing a first recess part 311 of a vehicle luggage box 300 according to an embodiment of the present disclosure, and FIG. 6 is a cross-sectional view taken along the line B-B of FIG. 5.

Referring to FIG. 1 to FIG. 6, the vehicle luggage box 300 according to a preferred embodiment of the disclosure will be described.

Specifically, the vehicle luggage box 300 according to embodiments of the present disclosure may include an inner housing 310 disposed between multiple pillar members no arranged in a longitudinal direction of the vehicle and bent so as to protrude upward from the upper body 100 of a vehicle and to connect sides of the upper body 100, the inner housing having a box shape to allow luggage to be loaded therein and having an opening part 315 formed to be open toward a lateral side of the vehicle, a gate 340 formed to cover the opening part 315 of the inner housing 310 and rotatably coupled to the upper part of the inner housing 310, and an outer housing 320 coupled to the inner housing 310 along the end of the opening part 315 of the inner housing and in contact with the end of the gate 340.

As illustrated in FIG. 1, the inner housing 310 may be formed in a box shape, and may have the opening part 315 formed through a side thereof, which enables luggage to be loaded in the inside of the inner housing 310 through the opening part 315 from the outside.

The opening part 315 of the inner housing 310 may be formed through the side surface of a vehicle, and the side surface, through which the opening part 315 is formed, may be disposed toward the sidewalk in a general driving road.

In the case of a right-hand traffic in which vehicles run on the right side of a road such as in Korea or the United States of America, the opening part 315 may be disposed on the right side of a vehicle, and in the case of a left-hand traffic in which vehicles run on the left side of a road such as in Japan or the United Kingdom, the opening part 315 may be disposed on the left side of a vehicle.

The lower part of the upper body 100 of a vehicle may be coupled and fixed to the upper part of the lower body 200, and the upper body 100 of a vehicle may be provided with the pillar members which are formed to connect both sides thereof and protrude upward and are configured to form both a pillar part and a loop part member of a vehicle. The multiple pillar members no may be arranged in the front/rear direction of a vehicle, and the inner housing 310 may be disposed between the multiple pillar members 110 such that both side surfaces thereof are coupled and fixed to the pillar members 110.

The gate 340 may be disposed at the upper part of the inner housing 310 to cover the opening part 315 of the inner housing 310 and may be coupled to be rotatable in the vertical direction on the side surface through which the opening part 315 is formed.

Therefore, when loading luggage, the gate 340 is opened upward to open the opening part 315, and when a vehicle runs, the gate 340 is rotated downward to close the opening part 315.

The outer housing 320, which is coupled outside the opening part 315 of the inner housing 310, may be provided to seal between the inner housing 310 and the gate 340 and may be also coupled to an outer panel of a vehicle so as to be connected to a chassis.

Therefore, it may be possible to prevent foreign materials from being introduced into the inner housing 310, and thus connectivity between the gate 340 and the inner housing 310 can be improved.

The inner housing 310 may be loaded with luggage and may be connected to a heating/cooling device to maintain an appropriate temperature or humidity required according to a type of luggage to be loaded.

When there is no requirement for an appropriate temperature or humidity, the heating/cooling device may be removed to reduce the manufacturing prime cost of a vehicle.

A weather strip 330, which is coupled to the end of the outer housing 320 so as to seal between the outer housing 320 and the gate 340, may be further included therein.

The weather strip 330 may be coupled to the outer housing 320, may be formed to extend along the end of the opening part 315, and may be disposed between the outer housing 320 and the gate 340 when the gate 340 is closed.

Therefore, the weather strip 330 may seal between the outer housing 320 and the gate 340, and thus may prevent foreign materials from entering the inner housing 310. In addition, the weather strip 330 may be made of an elastic material to reduce noise generated when the gate 340 is closed.

The inner housing 310 may include first recess parts 311 which are recessed outwardly on a side surface part thereof to be in contact with a chassis and coupled thereto by bolting.

As illustrated in FIG. 5 and FIG. 6, in order to couple the pillar members no formed in a pipe shape and the inner housing 310, the first recess part 311 may be formed to be recessed in the inside of the inner housing 310 and protrude outwardly, and the first recess part 311 may be disposed to correspond to a position of the pillar member 110.

A bolt V may be inserted into the first recess part 311 to simply couple the pillar members no and the inner housing 310 through coupling by bolting, and the bolt V may be fixed by a nut N.

Therefore, the vehicle luggage box 300 may be simply coupled to a vehicle when being coupled thereto, and it may be possible to easily change the size or the type of the vehicle luggage box 300 according to the needs of a customer.

The inner housing 310 may further include a recess part cover 312 which is rotatably coupled to the inner housing 310 so as to cover the first recess part 311.

As illustrated in FIG. 5 and FIG. 6, the recess part cover 312 may be rotatably provided inside the inner housing 310 to cover the first recess part 311 in order to improve the external appearance aesthetics of the inside of the inner housing 310.

The fastening or unfastening of a bolt may be performed in a state where the recess part cover 312 is opened, and when the fastening of the bolt is completed, the recess part cover 312 is closed to prevent the head part of the bolt V inside the inner housing from being seen and thus to improve the external appearance aesthetics of the inside of the inner housing 310. In addition, it may be possible to prevent the loaded luggage from being damaged by the head part of the bolt V.

The opening part 315 of the inner housing 310 may be formed to allow the side surface and upper surface of a vehicle to be open.

The opening part 315 of the inner housing 310 having a box shape may be formed to allow the side surface and upper surface of a vehicle to be open, and thus a customer can easily load or unload luggage in or from the inner housing 310.

In addition, the gate 340 may be formed to cover all of the opening part 315 formed to allow the side surface and the upper surface thereof to be open.

The inner housing 310 may include a flange part 314 configured to protrude inward from the opening part 315 and extend in a direction intersecting the protruding direction thereof, and the outer housing 320 may be coupled to the flange part 314.

As illustrated in FIG. 3, the flange part 314 may be provided to have a cross-section having a letter L shape which protrudes inward from the end of the opening part 315 of the inner housing 310 and extends to intersect the protruding portion, and the outer housing 320 may be coupled to an outer side of the flange part 314.

Therefore, when the inner housing 310 and the outer housing 320 are coupled, the contact area therebetween may be increased, the coupling force between the outer housing 320 and the inner housing 310 can be improved, and thus the outer housing 320 may more completely seal between the inner housing and the gate 340.

The outer housing 320 may include drainage channels 324 formed to allow moisture to flow downward.

Due to outside weather conditions such as rain or snow, moisture may be located between the outer housing 320 and the gate 340, or due to cooling the inside of the inner housing 310, moisture may be generated on the outer housing 320.

The drainage channels 324 may be configured such that moisture is discharged to the lower part of a vehicle in order to smoothly open or close the gate 340 and prevent moisture from being introduced into the inner housing 310 and may be provided in the outer housing 320 to extend downward.

One side of the upper end of the opening part 315 may be formed higher than the other side thereof, and the drainage channels 324 of the outer housing 320 may be configured to extend along the shape of the opening part 315.

As illustrated in FIG. 1, the point A of the upper end of the opening part 315 may be formed higher than the other side of the upper end.

The upper part side of the opening part 315 may be formed to be inclined due to the point A, the upper side of the outer housing 320 coupled along the end of the opening part 315 may be formed to be inclined, and the upper side of the drainage channels 324 provided in the outer housing 320 may also be formed to be inclined.

Therefore, moisture located in the upper part thereof may flow downward along the inclined drainage channels 324 and thus may move to the lower part of a vehicle.

The outer housing 320 may include an upper housing 322 coupled to the upper end of the opening part 315, a lower housing 323 coupled to the lower end of the opening part 315, and side housings 321 coupled to the side parts of the opening part 315, and the upper housing 322, the lower housing 323, and the side housings 321 may be connected to each other.

As illustrated in FIG. 1, the opening part 315 may be formed in a three-dimensional shape so as to allow the upper surface and the side surface of the inner housing 310 to be open, and the outer housing 320 may be provided with the upper housing 322 coupled to the upper side thereof, a lower housing 323 coupled to the lower side, and a pair of side housings 321 coupled to the lateral sides thereof so as to be coupled to the opening part 315 having the three-dimensional shape.

Both ends of the upper housing 322 may be connected to the upper ends of the pair of side housings 321 and both ends of the lower housing 323 may be connected to the lower ends of the side housings 321, and thus the outer housing 320 can be completed.

Therefore, the outer housing 320 can be coupled in close contact with the inner housing 310 along the end of the opening part 315.

The upper housing 322 and the upper sides of the side housings 321 may have ends formed so as to have steps and correspond to each other and be connected to overlap each other. In addition, the lower housing and the lower sides of the side housings may have ends formed so as to have steps and correspond to each other and be connected to overlap each other.

As illustrated in FIG. 4, when the ends of the upper housing 322, the lower housing 323, and the side housings 321 are connected to one another, stepped ends 321a and 322a, which are formed to correspond to one another and stepped to one another, may be coupled to overlap each other.

Therefore, the drainage channels 324 may be connected to each other, and when moisture flows along the drainage channel 324, it may be possible to prevent moisture from leaking from the connection portions between the upper housing 322 and the side housings 321 and between the lower housing 323 and the side housings 321. In addition, the coupling forces between the upper housing 322 and the side housings 321 and between the lower housing 323 and the side housings 321 may be improved.

The gate 340 may include a fixation part 341 formed at the lower end thereof and configured to fix the gate 340 to the inner housing 310, and the inner housing 310 may include an engaging part 370 formed at a position of the lower end of the opening part 315, which corresponds to the fixation part 341, and configured such that the engaging part engages with the fixation part 341 and fixes the fixation part 341.

As illustrated in FIG. 1, the fixation part 341, which is provided to fix the gate 340 to the inner housing 310, may be provided at the lower end of the gate 340, and the engaging part 370 may be provided at a position of the lower end of the inner housing 310, which corresponds to the fixation part 341, to engage with and be coupled to the fixation part 341.

When the gate 340 is closed, the fixation part 341 may engage with and be coupled to the engaging part 370 so that the gate 340 is fixed to close the opening part 315, and when the fixation part 341 is released from the fixation thereof, the gate 340 may be rotated upward to open the opening part 315 and to thus enable loading or unloading of luggage.

Figure 7:
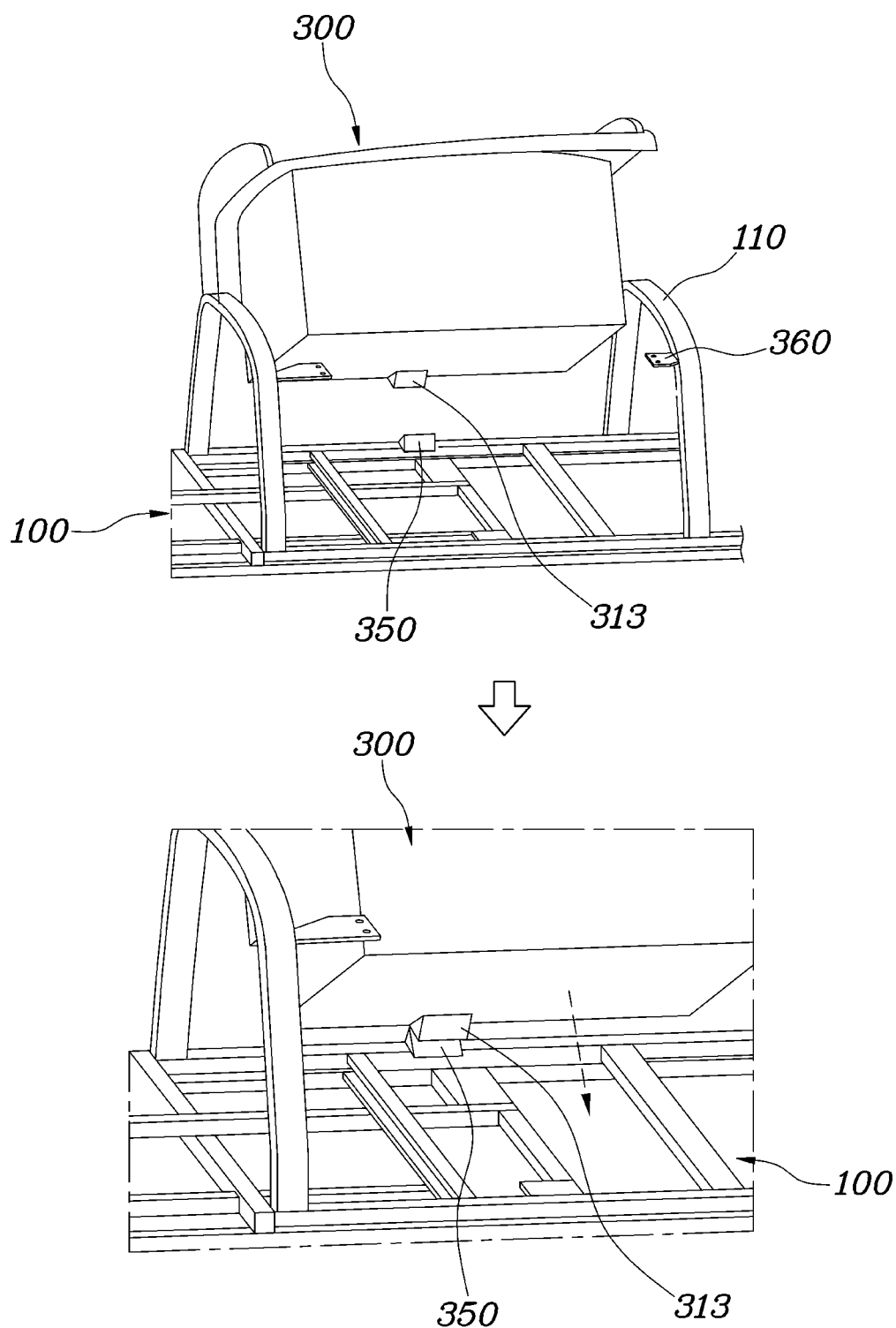
FIG. 7 is a view showing a rear side when a vehicle luggage box according to an embodiment of the present disclosure is coupled to a vehicle.
Figure 8:
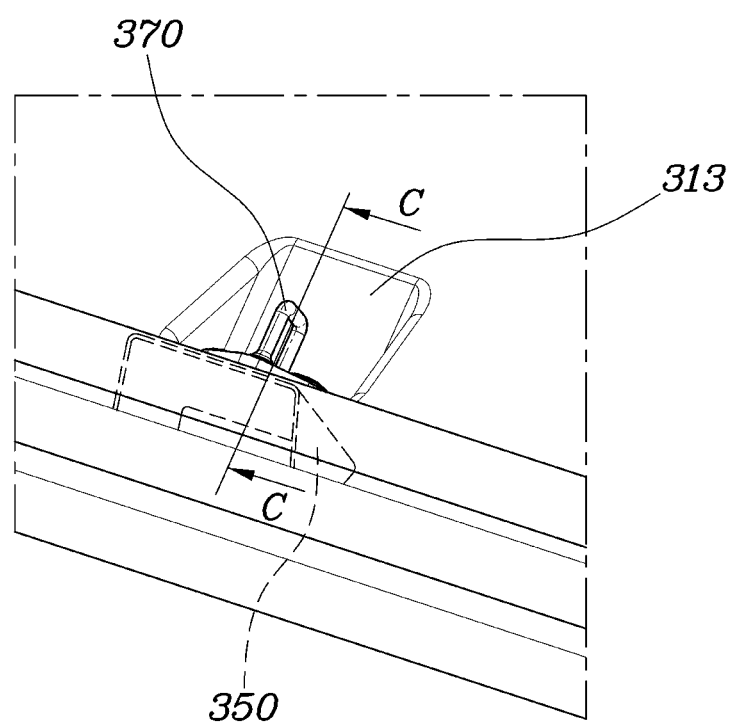
FIG. 8 is a perspective view of an engaging part included in a vehicle luggage box according to an embodiment of the present disclosure.
Figure 9:
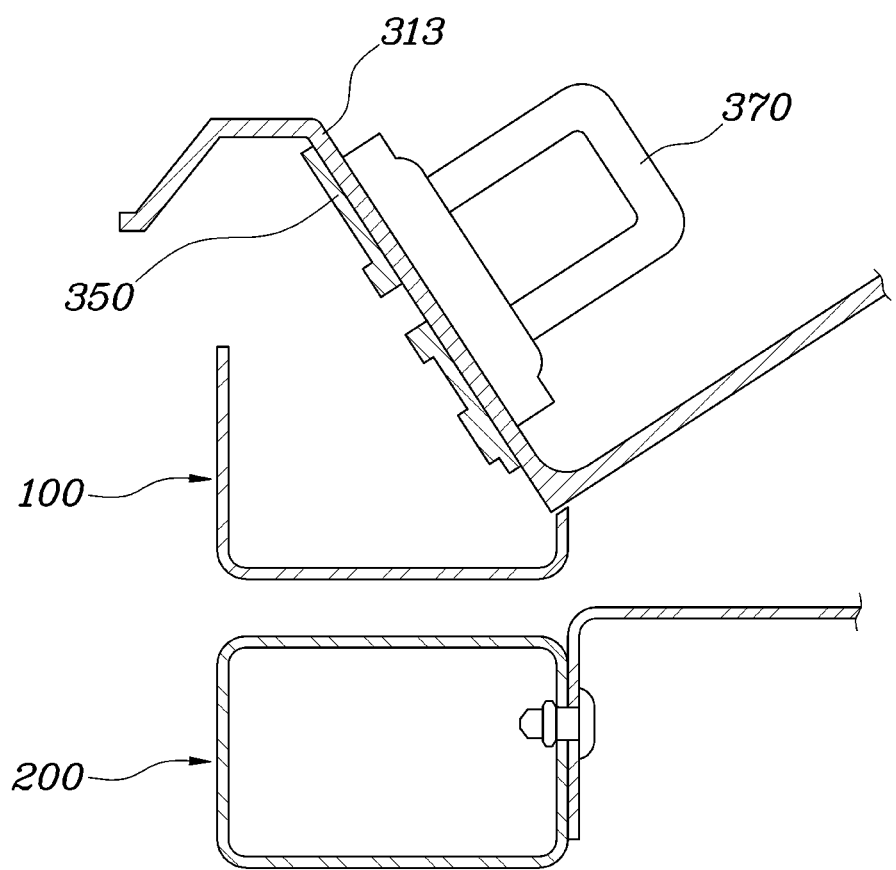
FIG. 9 is a cross-sectional view taken along the line C-C of FIG. 8.

FIG. 7 is a view showing a rear side when a vehicle luggage box 300 according to an embodiment of the present disclosure is coupled to a vehicle, FIG. 8 is a perspective view of an engaging part 370 included in a vehicle luggage box 300 according to an embodiment of the present disclosure, and FIG. 9 is a cross-sectional view taken along the line C-C of FIG. 8.

The inner housing 310 may have a second recess part 313 formed at the lower end of the opening part 315 to be recessed into the lower side of a chassis, the engaging part 370 may be disposed in the second recess part 313, and a first bracket 350, which is configured to connect the second recess part 313 and the chassis, may be further included therein. In addition, the first bracket 350, the engaging part 370, and the second recess part 313 may be coupled at once through coupling by the bolt V.

As illustrated in FIGS. 7 to 9, in order to couple the engaging part 370 to the inner housing 310, the second recess part 313 may be formed at a position at which the engaging part 370 is provided to be recessed thereinto, and the first bracket 350, which is configured to couple the second recess part 313 and the chassis, may be provided thereon.

The first bracket 350 may be formed to connect the upper body 100 and the inner housing 310, and the engaging part 370, the inner housing 310, and the first bracket 350 may be coupled at once through coupling by the bolt V.

Therefore, the engaging part 370 may be firmly fixed to a chassis, and as the fixation part 341 engages with and is coupled to the engaging part 370, the gate 340 may be firmly fixed to the chassis when being closed.

In addition, as illustrated in FIG. 7, when the inner housing 310 is disposed in order to couple the inner housing to a chassis, an outwardly protruding portion of the second recess part 313 may be in contact with the first bracket 350 to guide the arrangement position of the inner housing 310.

Figure 10:
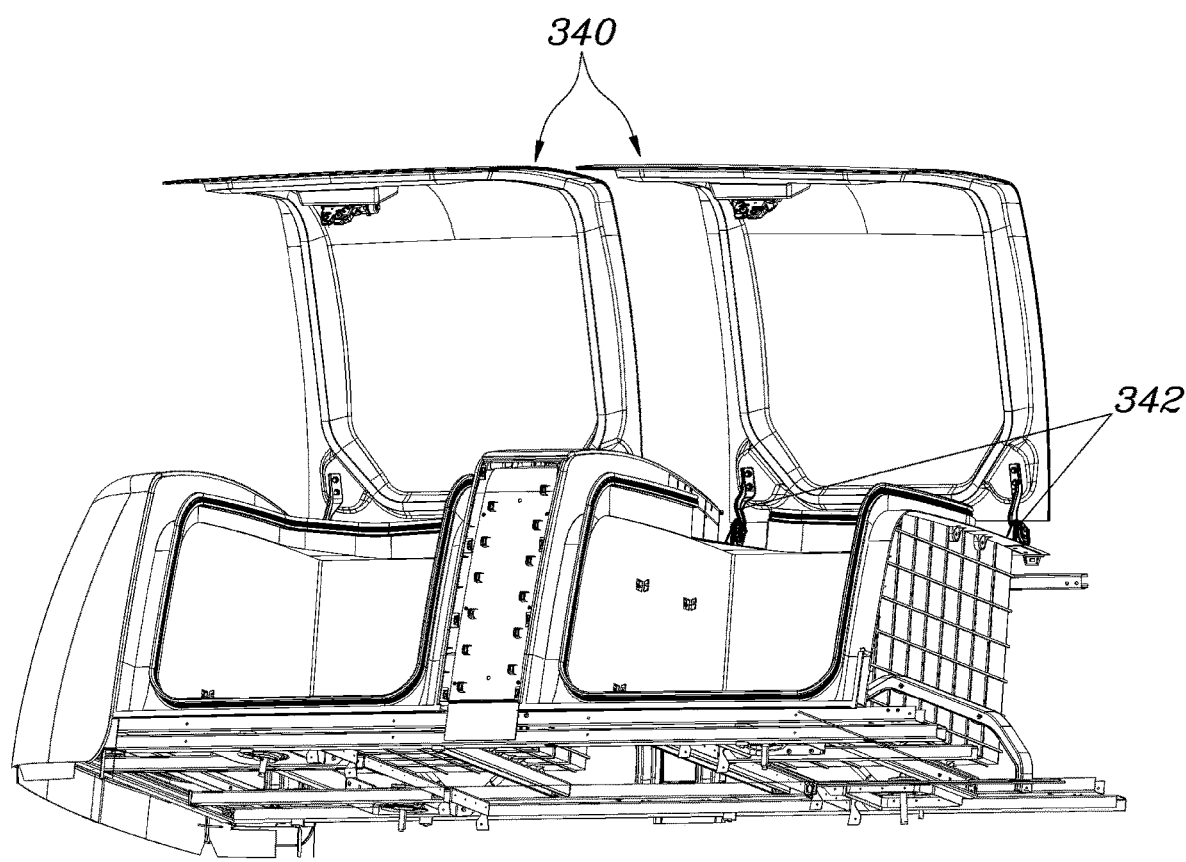
FIG. 10 is a rear view of a vehicle luggage box according to an embodiment of the present disclosure.
Figure 11:
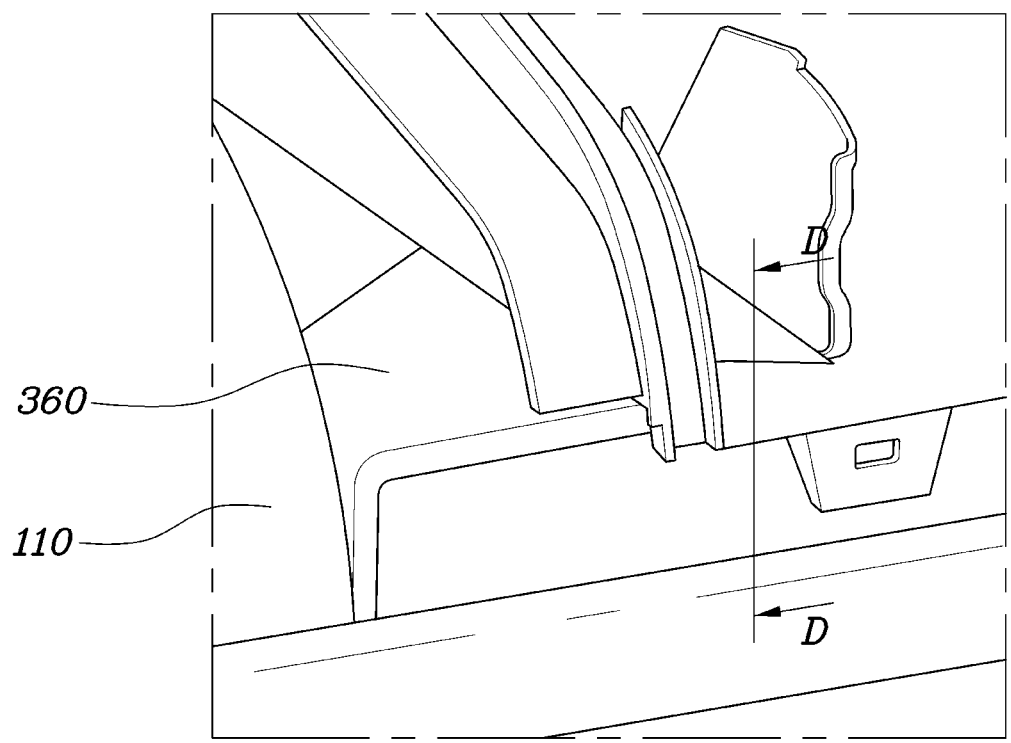
FIG. 11 is a partially enlarged view of FIG. 10.
Figure 12:
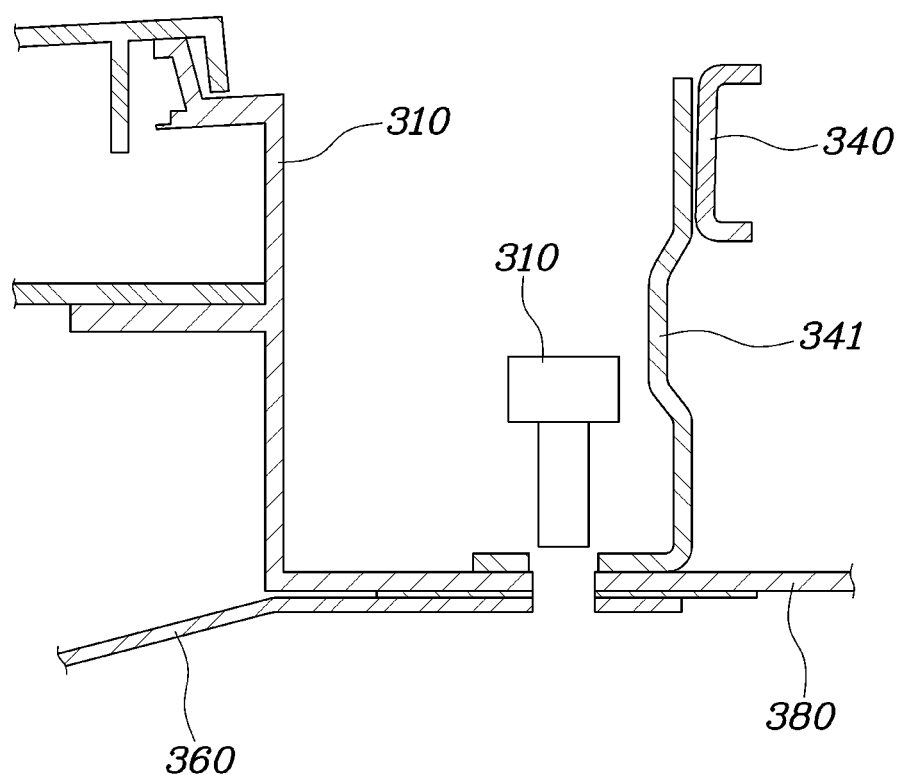
FIG. 12 is a cross-sectional view taken along the line D-D of FIG. 11.

FIG. 10 is a rear view of a vehicle luggage box 300 according to an embodiment of the present disclosure, FIG. 11 is a partially enlarged view of FIG. 10, and FIG. 12 is a cross-sectional view taken along the line D-D of FIG. 11.

A second bracket 360, which is configured to connect a chassis and the rear surface of the inner housing 310, may be further included therein, the gate 340 may include a hinge part 342 connected to the upper part of the inner housing 310, and the second bracket 360, the inner housing 310, and the hinge part 342 may be coupled at once through coupling by the bolt V.

As illustrated in FIG. 10 and FIG. 11, the hinge part 342 may be provided on the gate 340 to couple the gate 340 to the inner housing 310 or the outer housing 320, and the second bracket 360, which is configured to connect the rear surface part of the inner housing 310 and a chassis, may be provided thereon.

In addition, the second bracket 360, the hinge part 342, and the inner housing 310 may be coupled at once through coupling by the bolt V.

Therefore, the gate 340 connected to the inner housing 310 may be connected to a chassis through the second bracket 360 and can be firmly coupled to the chassis.

A steel plate 380, which is inserted between the inner housing 310 and the second bracket 360, may be further included therein, and the coupling by the bolt V may be made through the steel plate 380.

The inner housing 310 and the second bracket 360 may be formed of a synthetic resin material, and the inner housing 310 and the second bracket 360 having the synthetic resin material are coupled through coupling by the bolt V, thus damage may occur due to the coupling pressure by the bolt V.

In order to prevent the damage, the steel plate 380 may be disposed between the inner housing 310 and the second bracket 360. Therefore, the inner housing 310, the steel plate 380, and the second bracket 360 may be coupled through coupling by the bolt V in which the bolt V extends therethrough, and the steel plate 380 may be also applied to other portions described in embodiments of the present disclosure, which are formed of a synthetic resin material and coupled to each other.

The multiple pipes, which constitute the upper body 100 or the lower body 200 and each of which has an open end, may be further included therein, and an end patch 20, which is coupled to close the open end so as to connect the multiple pipes to each other, may be further included therein. The end patch 20 may be inwardly spaced apart from the end of the pipe of the upper body 100 or the lower body 200 and coupled thereto by welding, and a bead generated by the welding may be positioned in a distancing space formed by the end patch being inwardly spaced apart from the pipe of the upper body 100 or the lower body 200.

Figure 13:
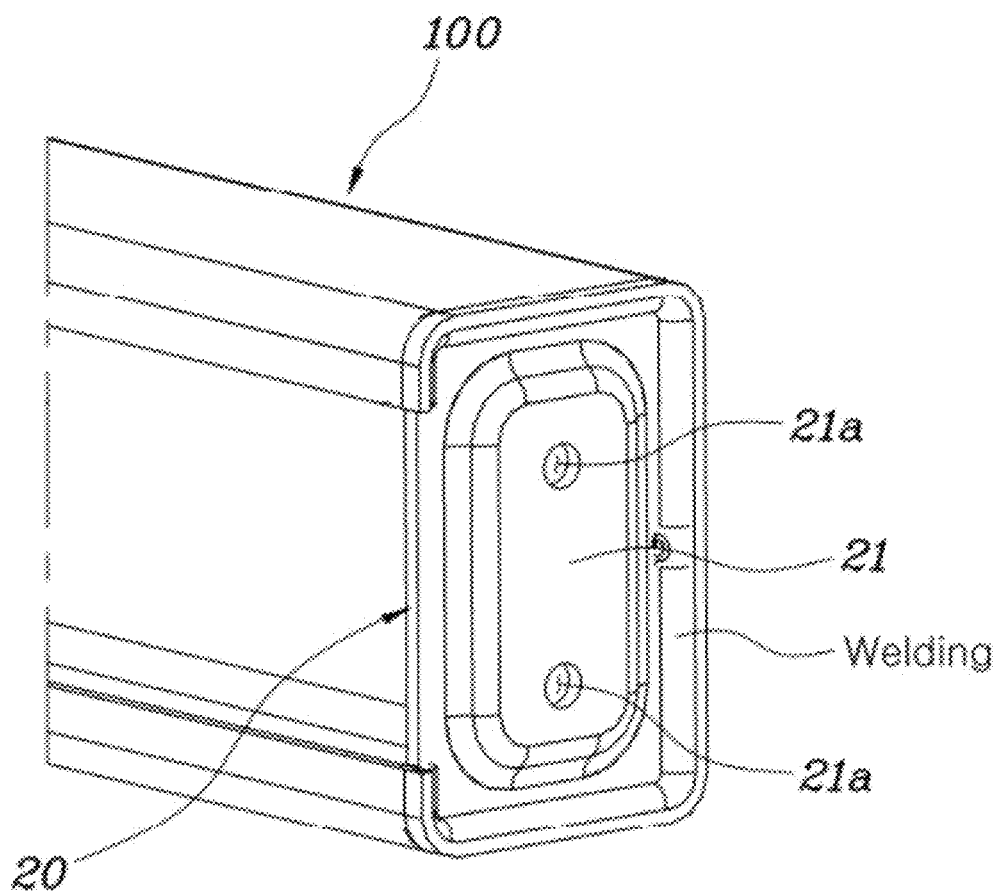
FIG. 13 is a perspective view in which an end patch is coupled to a pipe of an upper body or a lower body according to an embodiment of the present disclosure.

FIG. 13 is a perspective view in which an end patch 20 is coupled to a pipe of the upper body 100 or the lower body 200 according to an embodiment of the present disclosure.

As illustrated in FIG. 13, the end patch 20 may be coupled to the end of the pipe of the upper body 100, and identically, the end patch 20 may be also coupled to the end of the pipe of the lower body 200. Therefore, when manufacturing the upper body 100 or the lower body 200 of a vehicle, the multiple pipes can be simply fastened to each other by bolting or riveting.

In addition, the end patch 20 may be coupled thereto by welding in a state of being inwardly spaced apart from the end of the upper body 100 or the lower body 200, and thus the welding bead may be positioned inside the distancing space. Therefore, work of grinding of the welding bead is unnecessary. Accordingly, the manufacturing work thereof can be simplified compared to the conventional manufacturing process of bending and then welding the end of a pipe, and grinding of a welding bead after the welding.

In addition, a coupling part 21 formed on the end patch 20 may be configured to protrude more than the end of the pipe, and may be coupled to the coupling part of another pipe. Therefore, vibration or noise generated on the coupling portion therebetween can be minimized.

A through-hole 21a may be formed through the coupling part 21, and thus a pipe and another pipe may be coupled by mechanical coupling including bolting or riveting when being coupled to each other. Therefore, the multiple pipes may be simply coupled to each other and thus a chassis can be completed in a smart factory. Accordingly, the prime cost thereof can be reduced and the manufacturing process thereof can be simplified.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A luggage box for a vehicle, the luggage box comprising:
    an inner housing disposed between multiple pillar members arranged in a longitudinal direction of the vehicle and bent so as to protrude upward from an upper body of the vehicle and to connect sides of the upper body of the vehicle, the inner housing having a box shape to allow an item to be loaded therein and having an opening part openable toward a lateral side of the upper body of the vehicle;
    a gate covering the opening part of the inner housing and rotatably coupled to an upper part of the inner housing;
    an outer housing coupled to the inner housing along an end of the opening part of the inner housing and in contact with an end of the gate; and
    multiple pipes defining the upper body, each having an open end and an end patch coupled to close the open end so as to connect the multiple pipes to each other.

2. The luggage box of claim 1, further comprising a weather strip coupled to an end of the outer housing to provide a seal between the outer housing and the gate.

3. The luggage box of claim 1, wherein the inner housing comprises a first recess part recessed outwardly on a side surface part thereof to be in contact with a chassis and coupled thereto by bolting.

4. The luggage box of claim 3, wherein the inner housing further comprises a recess part cover rotatably coupled to the inner housing so as to cover the first recess part.

5. The luggage box of claim 3, further comprising a weather strip coupled to an end of the outer housing to provide a seal between the outer housing and the gate.

6. The luggage box of claim 1, wherein:
    the gate comprises a fixation part provided at a lower end thereof to fix the gate to the inner housing; and
    the inner housing comprises an engaging part provided at a position of a lower end of the opening part, which corresponds to the fixation part, such that the engaging part engages with the fixation part and fixes the fixation part.

7. The luggage box of claim 6, wherein:
    the inner housing has a second recess part provided at the lower end of the opening part to be recessed into a lower side of a chassis;
    the engaging part is disposed in the second recess part;
    a first bracket connecting the second recess part and the chassis is further included therein; and
    the first bracket, the engaging part, and the second recess part are coupled at once by bolt coupling.

8. The luggage box of claim 6, further comprising a weather strip coupled to an end of the outer housing to provide a seal between the outer housing and the gate.

9. The luggage box of claim 1, wherein:
a second bracket configured to connect a chassis and a rear surface of the inner housing is further included therein;
the gate comprises a hinge part connected to the upper part of the inner housing; and
the second bracket, the inner housing, and the hinge part are coupled at once by bolt coupling.

10. The luggage box of claim 9, further comprising a steel plate inserted between the inner housing and the second bracket, wherein the bolt extends through the steel plate.

11. The luggage box of claim 1, wherein the end patch is inwardly spaced apart from the end of the pipe of the upper body and coupled thereto by welding, and a bead generated by welding is positioned in a distancing space defined by the end patch being inwardly spaced apart from the end of the pipe of the upper body.

12. A luggage box for a vehicle, the luggage box comprising:
an inner housing disposed between multiple pillar members arranged in a longitudinal direction of the vehicle and bent so as to protrude upward from an upper body of the vehicle and to connect sides of the upper body, the inner housing having a box shape to allow an item to be loaded therein and having an opening part openable toward a lateral side of the upper body of the vehicle, wherein the opening part of the inner housing allows a side surface and an upper surface of the vehicle to be open;
a gate covering the opening part of the inner housing and rotatably coupled to an upper part of the inner housing; and
an outer housing coupled to the inner housing along an end of the opening part of the inner housing and in contact with an end of the gate, wherein the outer housing comprises an upper housing coupled to an upper end of the opening part, a lower housing coupled to a lower end of the opening part, and side housings coupled to lateral sides of the opening part.

13. The luggage box of claim 12, wherein:
the inner housing comprises a flange part protruding inward from a side of the opening part and extends in a direction intersecting the protruding direction thereof; and
the outer housing is coupled to the flange part.

14. The luggage box of claim 12, wherein the outer housing comprises a drainage channel allowing moisture to flow downward.

15. The luggage box of claim 14, wherein a first side of the upper end of the opening part is located higher than a second side thereof, and wherein the drainage channel of the outer housing extends along a shape of the opening part.

16. The luggage box of claim 12, wherein the upper housing, the lower housing, and the side housings are connected to one another.

17. The luggage box of claim 12, wherein the upper housing, the lower housing, and the side housings have ends disposed so as to have steps and to correspond to one another and are connected so as to overlap one another.

18. A vehicle comprising:
a lower body comprising a first plurality of pipes coupled to each other;
an upper body comprising a second plurality of pipes coupled to each other, the upper body being coupled to the lower body; and
a luggage box comprising:
multiple pillar members arranged in a longitudinal direction of the vehicle and bent so as to protrude upward from the upper body of the vehicle and to connect sides of the upper body;
an inner housing disposed between the multiple pillar members, the inner housing having a box shape to allow an item to be loaded therein and having an opening part openable toward a lateral side of the upper body of the vehicle, wherein the inner housing comprises a first recess part recessed outwardly on a side surface part thereof to be in contact with a chassis and coupled thereto by bolting and wherein a recess part cover is rotatably coupled to the inner housing so as to cover the first recess part;
a gate covering the opening part of the inner housing and rotatably coupled to an upper part of the inner housing; and
an outer housing coupled to the inner housing along an end of the opening part of the inner housing and in contact with an end of the gate.

19. The vehicle of claim 18, further comprising a weather strip coupled to an end of the outer housing to provide a seal between the outer housing and the gate.

20. The vehicle of claim 18, wherein:
the gate comprises a fixation part provided at a lower end thereof to fix the gate to the inner housing;
the inner housing comprises:
a second recess part provided at a lower end of the opening part to be recessed into a lower side of the chassis; and
an engaging part disposed in the second recess part at a position corresponding to the fixation part, such that the engaging part engages with the fixation part and fixes the fixation part; and
a first bracket connecting the second recess part and the chassis is further included therein; and
the first bracket, the engaging part, and the second recess part are coupled at once by bolt coupling.

* * * * *